United States Patent
Kwok et al.

(10) Patent No.: US 11,310,700 B2
(45) Date of Patent: Apr. 19, 2022

(54) DELAYED RADIO DOMAIN FALLBACK

(71) Applicant: T-Mobile USA, Inc., Bellevue, WA (US)

(72) Inventors: Ming Shan Kwok, Seattle, WA (US); Hsin-Fu Henry Chiang, Bellevue, WA (US); Jun Liu, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 36 days.

(21) Appl. No.: 16/554,166

(22) Filed: Aug. 28, 2019

(65) Prior Publication Data
US 2020/0112887 A1    Apr. 9, 2020

Related U.S. Application Data

(60) Provisional application No. 62/740,875, filed on Oct. 3, 2018.

(51) Int. Cl.
*H04L 29/06* (2006.01)
*H04W 36/30* (2009.01)
*H04W 36/00* (2009.01)
*H04L 65/1016* (2022.01)
(Continued)

(52) U.S. Cl.
CPC ..... *H04W 36/0022* (2013.01); *H04L 65/1006* (2013.01); *H04L 65/1016* (2013.01); *H04L 65/1083* (2013.01); *H04W 36/00837* (2018.08); *H04W 36/30* (2013.01)

(58) Field of Classification Search
CPC ............. H04W 36/0022; H04W 36/30; H04W 36/00837; H04W 65/1083; H04L 65/1016; H04L 65/1006
See application file for complete search history.

(56) References Cited

U.S. PATENT DOCUMENTS

2010/0150014 A1* 6/2010 Oda ........................ H04L 65/80
370/252
2013/0272194 A1* 10/2013 Keller ............... H04W 36/0022
370/328
(Continued)

FOREIGN PATENT DOCUMENTS

EP             3307010 A1    4/2018
KR       20140144314 A      12/2014

OTHER PUBLICATIONS

3GPP; TSGSA; "System Architecture for the 5G System; Stage 2 (Release 15)", 3GPP TS 23.501 V15.3.0, Sep. 17, 2018, See section 5.16.3.10, 227 pages.

(Continued)

*Primary Examiner* — Yaotang Wang
(74) *Attorney, Agent, or Firm* — Lee & Hayes, P.C.

(57) ABSTRACT

A fifth generation (5G) radio access network (RAN) can determine that a user equipment (UE) should fall back to engaging in a communication session over an LTE-based Evolved Packet System (EPS) instead of a 5G system. However, to avoid interrupting setup operations that may be occurring separately for that communication session in an IP Multimedia Subsystem (IMS) apart from the 5G system, the EPS fallback can be delayed such that setup in the IMS can proceed at least to a point at which IMS signaling messages are less likely to be undeliverable due to the EPS fallback.

20 Claims, 8 Drawing Sheets

(51) Int. Cl.
*H04L 65/10* (2022.01)
*H04L 65/1083* (2022.01)

(56) References Cited

U.S. PATENT DOCUMENTS

| | | | |
|---|---|---|---|
| 2015/0181513 A1* | 6/2015 | Sharma | H04W 48/18 370/328 |
| 2017/0055197 A1 | 2/2017 | Shukair et al. | |
| 2019/0174003 A1* | 6/2019 | Chandramouli | H04L 65/1016 |
| 2020/0305032 A1* | 9/2020 | Kuppelur | H04W 76/50 |
| 2021/0014741 A1* | 1/2021 | Hallenst | H04W 28/0268 |

OTHER PUBLICATIONS

Elnashar, et. al., "Practical Performance Analyses of Circuit-Switched Fallback and Voice Over LTE", In: IEEE Transactions on Vehicular Technology, vol. 66, Issue 2, Feb. 2017, See sections III-IV, and figure 4, 13 pages.

The PCT Search Report and Written Opinion dated Jan. 10, 2020, for PCT Application No. PCT/US2019/052963, 13 pages.

\* cited by examiner

DELAYED RADIO DOMAIN FALLBACK

RELATED APPLICATIONS

This U.S. patent application claims priority to U.S. Provisional Patent Application No. 62/740,875, entitled "DELAYED RADIO DOMAIN FALLBACK," filed on Oct. 3, 2018, the entirety of which is incorporated herein by reference.

BACKGROUND

As new generations of radio access technologies are developed and deployed in new radio access networks (RANs), network operators often continue to also operate older RANs based on older radio access technologies. This can help ensure compatibility with older user equipment (UE), as well as provide fallback options that can allow UEs to retry failed connections on older radio access networks.

For example, a UE can attempt to place a call via a fifth generation (5G) RAN, but fall back to retrying the call over a Long-Term Evolution (LTE) RAN if the call fails over the 5G RAN. Similarly, a UE can attempt to place a voice call as a Voice over LTE (VoLTE) call or other type of packet-switched voice call via a RAN in a packet-switched domain, but be able to fall back to retrying the voice call in a circuit-switched domain via a third generation (3G) RAN or any other circuit-switched domain RAN.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
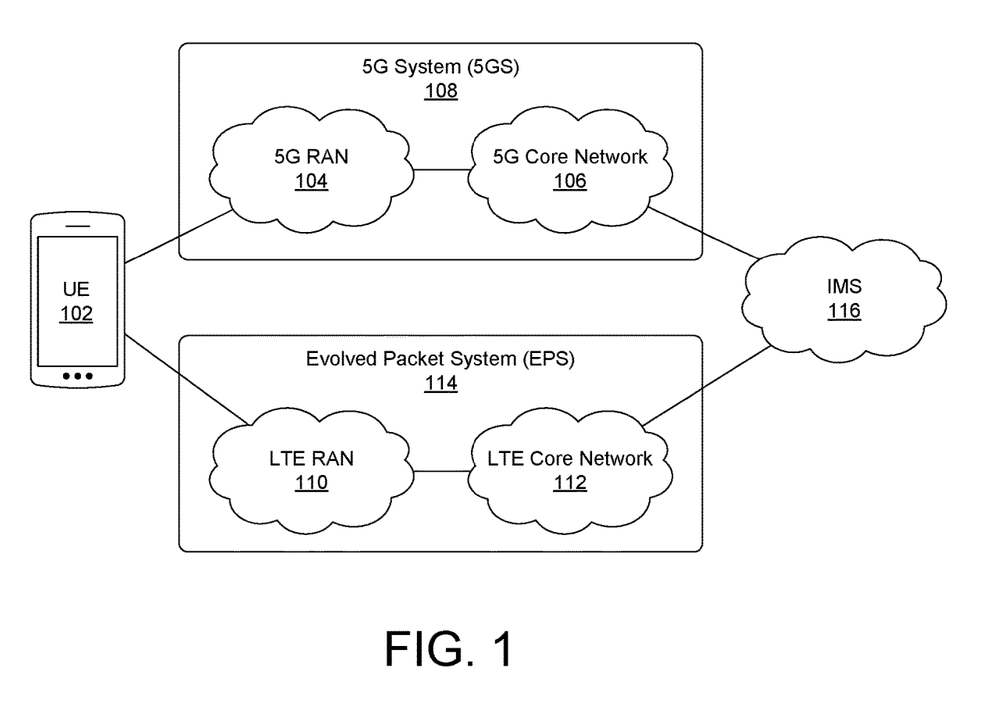
FIG. 1 depicts an example network environment in which a user equipment (UE) can connect to a telecommunication network.

FIG. 1 depicts an example network environment in which a user equipment (UE) 102 can connect to a telecommunication network to engage in communication sessions for voice calls, video calls, messaging, data transfers, or other types of communications. The telecommunication network can include multiple radio access networks (RANs) based on different radio access technology domains. Operating multiple RANs concurrently in the telecommunication network can provide fallback options for a UE 102 that has trouble connecting through one RAN, for instance by allowing the UE to retry a failed connection through a different RAN.

A UE 102 can be any device that can wirelessly connect to the telecommunication network. For example, a UE 102 can be a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for a UE 102 is illustrated in greater detail in FIG. 7, and is described in detail below with reference to that figure.

The telecommunication network can include one or more RANs, as well as one or more core networks linked to the RANs. A UE 102 can wirelessly connect to a base station or other access point of a RAN, and in turn be connected to a core network. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

In particular, as shown in the example of FIG. 1, a UE 102 can connect to a base station of a 5G RAN 104 that is linked to a 5G core network 106. Overall, the combination of a 5G RAN 104 and a 5G core network 106 can be referred to as a 5G system (5GS) 108. The 5G RAN 104 can also be referred to as a Next Generation (NG) RAN. A base station of the 5G RAN 104 can be known as a gNB. Example architecture for a gNB is illustrated in greater detail in FIG. 8 and is described in detail below with reference to that figure.

The 5G core network 106 can have a service-based architecture that includes multiple types of network functions that process control plane data and/or user plane data to implement services for UEs 102. For example, network functions of the 5G core network 106 can include an Access and Mobility Management Function (AMF), a Session Management Function (SMF), a User Plane Function (UPF), a Policy Control Function (PCF), and/or other network functions implemented in software and/or hardware.

Also as shown in the example of FIG. 1, a UE 102 can connect to a base station of an LTE RAN 110 that is linked to an LTE core network 112. Overall, the combination of an LTE RAN 110 and an LTE core network 112 can be referred to as an Evolved Packet System (EPS) 114. The LTE RAN 110 can also be referred to as an Evolved Universal Mobile Telecommunications System (UMTS) Terrestrial Radio Access Network (E-UTRAN). A base station of the LTE RAN 110 can be known as an evolved Node B (eNB).

The LTE core network 112 can include multiple elements that that process control plane data and/or user plane data for UEs 102. For example, the LTE RAN 110 can include a Mobility Management Entity (MME), Serving Gateways (SGWs), Packet Data Network (PDN) Gateways (PGWs), a Home Subscriber Server (HSS), a Policy and Charging Rules Function (PCRF), and/or other network elements. The LTE core network 112 can also be referred to as an Evolved Packet Core (EPC).

The UE's connection through the 5G RAN 104 and the 5G core network 106, and/or through the LTE RAN 110 and the LTE core network 112, can allow the UE 102 to connect to an Internet Protocol (IP) Multimedia Subsystem (IMS) 116. the IMS 116 can set up and manage communication sessions for the UEs 102, including sessions for voice calls, video calls, and/or other types of communications. For example, the UE 102 and the IMS 116 can exchange Session Initiation Protocol (SIP) messages to set up and manage individual communication sessions.

Although the 5GS 108 and/or EPS 114 may be configured to set up and manage network resources associated with communication sessions, services for such communication sessions can be implemented by the IMS 116. For example, although the EPS 114 can set up a dedicated bearer for a UE 102 to transport data packets associated with a voice or video call, the voice or video call can be set up and managed using SIP messages exchanged between the UE 102 and the IMS 116.

In some examples, fallback procedures can prompt a UE 102 to fall back to a different RAN in a different type of radio domain during setup of a communication session. For instance, a UE 102 may initially be connected to the 5G RAN 104 and 5G core network 106 of the 5GS 108. However, if the 5GS 108 is not able to handle voice or video calls when the UE 102 attempts to make or receive such a call, the 5GS 108 may instruct the UE 102 to fall back to the EPS 114 to engage in the call session.

Figure 2:
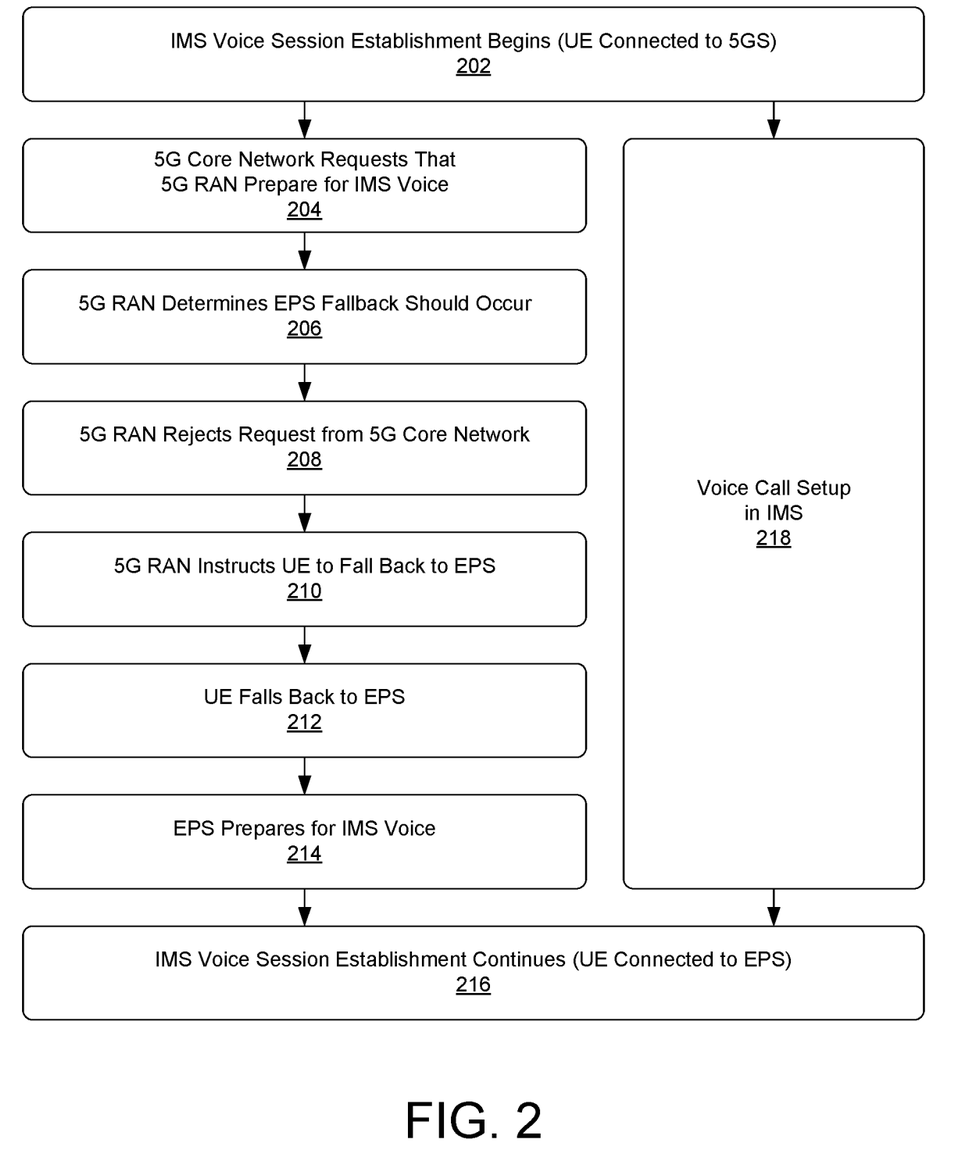
FIG. 2 depicts a flow diagram of an example process in which a voice call is attempted via a 5G system, but a 5G radio access network (RAN) instructs a UE to fall back to an LTE-based Evolved Packet System (EPS) to connect the voice call.

As an example, FIG. 2 depicts a flow diagram of an example process in which a voice call is attempted via the 5GS 108, but the 5G RAN 104 instructs a UE 102 to fall back to the LTE-based EPS 114 to connect the voice call. At block 202, establishment of a voice call session through the IMS 116 can begin. For example, a UE 102 can send or receive a SIP INVITE message to initiate a voice call session. At block 204, the 5G core network 106 can request that the 5G RAN 104 prepare for the IMS voice session. For example, a PCF in the 5G core network 106 may receive information from the IMS 116 indicating that an IMS voice session is being set up in the IMS 116, and in response the PCF can send a Protocol Data Unit (PDU) session modification request to the 5G RAN 104 requesting setup of a Quality of Service (QoS) flow for the IMS voice session.

However, at block 206, the 5G RAN 104 can determine that the 5G RAN 104 and/or the 5G core network 106 is not able to handle traffic for the IMS voice session, and that an EPS fallback should occur so that the voice call is instead handled via the LTE RAN 110 and LTE core network 112 of the EPS 114. In some examples, the 5G RAN 104 may be configured to handle the transmission of many types of data for UEs 102, but be configured to specifically avoid transmitting data for voice calls. For example, some gNBs of the 5G RAN 104 may be brought online initially to handle general types of data, but during an initial period may be configured to avoid handling voice calls because voice call flows in the 5GS 108 are still under development and more mature voice call flows in the EPS 114 are expected to provide a better user experience. Until these gNBs are upgraded or have voice call handling turned on, these gNBs can be configured to automatically reject PDU session modification requests to set up QoS flows for IMS voice sessions, or otherwise be configured to avoid handling voice call traffic. In other examples, the 5G RAN 104 and/or the 5G core network 106 may be overloaded, be experiencing errors, and/or be experiencing any other issue that causes the 5G RAN 104 to determine that the 5GS 108 cannot handle a voice call and that EPS fallback should occur instead.

When the 5G RAN 104 determines that EPS fallback should occur, at block 208 the 5G RAN 104 can reject the request from the 5G core network 106 received at block 204, such as a PDU session modification request. The 5G RAN 104 may also indicate to the 5G core network 106 that IMS voice fallback is in progress. In some examples, the 5G RAN 104 can also request that the UE 102 begin taking and/or reporting certain measurements, such as signal strength measurements that may assist in the selection of a particular eNB of the LTE RAN 110 for the UE 102 during a later EPS fallback.

At block 210, the 5G RAN 104 can instruct the UE 102 to fall back to the EPS 114 and attach to the LTE RAN 110. For example, the 5G RAN 104 can send a handover message or a release-and-redirect request to the UE 102 that instructs the UE 102 to connect to the LTE RAN 108 as part of the EPS fallback process. At block 212, the UE 102 can accordingly fall back to the EPS 114. In some examples, this can involve a Tracking Area Update (TAU) procedure, the UE 102 detaching from a gNB of the 5G RAN 104, the UE 102 attaching to an eNB of the LTE RAN 110 using a PDN connectivity request with, for example, a "handover" request type, and/or other operations. Thereafter, at block 214, the EPS 114 can prepare for the IMS voice session. For example, the EPS 114 can set up a dedicated bearer for traffic of the IMS voice session for the UE 102. After this EPS fallback and the UE 102 is connected to the EPS 114, the establishment of the IMS voice session between the UE 102 and the IMS 116 can continue at block 216.

However, while the IMS 116 can be involved in the process of FIG. 2 at blocks 202 and 216, the IMS 116 is not directly involved in the EPS fallback procedure that occurs between blocks 204 and 214. Standard setup of the voice call session, or attempted setup of the voice call session, may continue separately at block 218 within the IMS 116. Accordingly, the setup or attempted setup of the voice call setup in the IMS 116 can occur concurrently and/or in parallel with the operations of the RANs and core networks described with respect to blocks 204 to 214, without the IMS 116 receiving any indication that an EPS fallback process is happening. For example, the UE 102 and IMS 116 may be exchanging, or be attempting to exchange, one or more SIP messages at block 218 at the same time that any of blocks 204-214 are occurring.

Operations similar to the operations described with respect to FIG. 2 can also occur with other types communications, such as video calls. For example, if the 5G RAN 104 has been configured to avoid handling video calls, the 5G RAN 104 can similarly instruct a UE 102 to perform an EPS fallback even while the IMS 116 continues to concurrently set up a video call session with any indication that the EPS fallback is happening.

An EPS fallback and separate IMS setup can introduce race conditions that may delay call setup and/or otherwise negatively impact a user's experience with an attempted call. For example, if the 5G RAN 104 instructs the UE 102 to fall back to the EPS 114 at block 210 as described above, SIP messages being exchanged between the IMS 116 and the UE 102 may be lost or become undeliverable when the UE 102 attaches to the LTE RAN 110 instead of the 5G RAN 104. The IMS 116 may continue to attempt to deliver a particular SIP message to the UE 102 via the 5G RAN 104, even though the UE 102 has fallen back to the LTE RAN 110, and delivery of the SIP message may fail via the 5G RAN 104.

Although undeliverable SIP messages can later be retransmitted, such retransmissions may lead to delays of several seconds, thereby negatively impacting user experience and delaying setup of the call overall.

Figure 3:
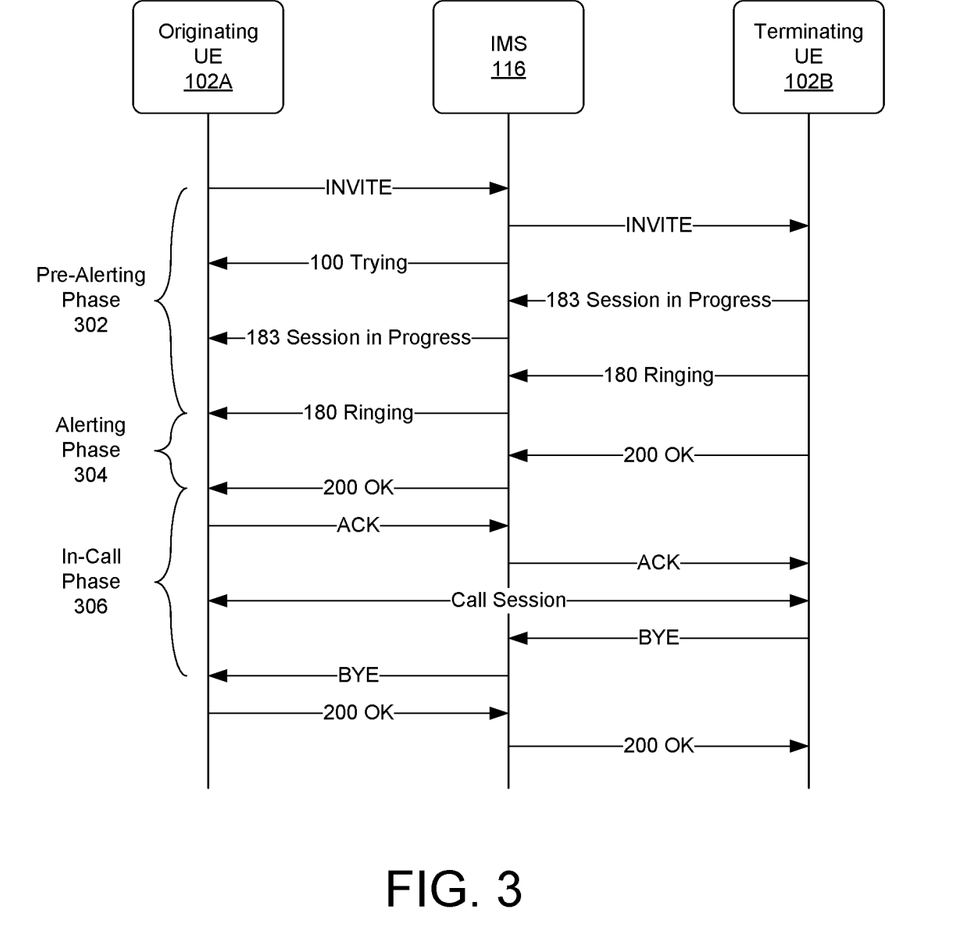
FIG. 3 depicts a Session Initiation Protocol (SIP) messaging flow during a typical call setup through an IP Multimedia Subsystem (IMS), which may be at least partially interrupted or delayed due to an ill-timed EPS fallback.

FIG. 3 depicts a SIP messaging flow during a typical call setup through the IMS 116, which may be at least partially interrupted or delayed due to an ill-timed EPS fallback. For example, an originating UE 102A can send a SIP INVITE message to the IMS 116 to initiate a call to a terminating UE 102B. The IMS 116 can forward the SIP INVITE message to the terminating UE 102B, and also send back a "100 Trying" message to the originating UE 102A. When the terminating UE 102B receives the SIP INVITE message, it can respond with a "180 Ringing" message to the IMS 116 to indicate that UE 102B is now ringing to alert a user of the call attempt, and the IMS 116 can forward the "180 Ringing" message to the originating UE 102A. In some examples, the originating UE 102A may respond to a "180 Ringing" message by playing back a local ringback tone for a user of the originating UE 102A. From the perspective of the originating UE 102A, the period between sending the SIP INVITE message and receiving the "180 Ringing" message indicating that the terminating UE 102B is ringing can be known as a pre-alerting phase 302. In some examples, the terminating UE 102B can also send other types of messages during the pre-alerting phase 302. For example, before the terminating UE 102B rings, the terminating UE 102B can also send a "183 Session in Progress" message to the IMS 116 to be forwarded to the originating UE 102A.

When the terminating UE 102B answers the call, the terminating UE 102B can send a "200 OK" message to the IMS 116 to be forwarded to the originating UE 102A. In some examples, messages such as a "183 Session in Progress" or a "200 OK" message can include a Session Description Protocol (SDP) element that indicates which types of protocols or codecs the terminating UE 102B supports for voice calls or video calls.

In some examples, from the perspective of the originating UE 102A, the period between receiving the "180 Ringing" message indicating that the terminating UE 102B is ringing and receiving the "200 OK" message indicating that the terminating UE 102B has answered the call can be known as an alerting phase 304. In other examples, the alerting phase 304 may be considered to begin at any other point, such as after the originating UE 102A receives a "183 Session in Progress" message that includes SDP information about the terminating UE 102B.

Following receipt of the "200 OK" message at the originating UE 102A, the originating UE 102A can return an acknowledgement (ACK) to the terminating UE 102B via the IMS 116 and the call session can begin. This phase can be known as the in-call phase 306. When one of the UEs 102 ends the call, the UE 102 can send a "BYE" message to the other UE 102 through the IMS 116, and the other UE 102 can confirm the end of the call with an "200 OK" message sent through the IMS 116.

As shown in FIG. 3, there are many points in the SIP messaging flow at which either the originating UE 102A or the terminating UE 102B has sent a message but has not yet received a response to that message from the other UE 102. If at any of these points the UE 102 were to follow an instruction from a 5G RAN 104 to perform an EPS fallback, for example an instruction received at block 210 of FIG. 2, the UE 102 may detach from the 5G RAN 104 and move to the LTE RAN 110 instead. Because the IMS 116 has not received any indication of the UE's EPS fallback, the IMS 116 may attempt to deliver a response message via the 5G RAN 104 the UE 102 is no longer connected to, and delivery of the response message the UE 102 had been waiting for can fail. Overall, this can lead to delays in call setup that can negatively impact a user's experience.

For example, during the pre-alerting phase 302, if the originating UE 102A performs an EPS fallback based on an instruction from the 5G RAN 104 after the originating UE 102A sends its SIP INVITE message but before the IMS 116 returns a "180 Ringing" message from the terminating UE 102B, the IMS 116 may be unable to deliver a "180 Ringing" message through the 5GC 108 to the UE 102 and the originating UE 102A would not timely discover that the call is ringing. Although the IMS 116 and/or terminating UE 102B can attempt a later redelivery of the "180 Ringing" message after the UE 102 reconnects via the EPS 114, the redelivery may be delayed by at least a few seconds. This may, in some examples, delay the playback of a local ringback tone and thus impact the user experience.

As another example, during the alerting phase 304, if an EPS fallback occurs while the originating UE 102A is waiting for a "200 OK" message to indicate that the call has been answered at the terminating UE 102B, the IMS 116 may be unable to deliver a "200 OK" message through the 5GC 108 to the originating UE 102. Even if a later redelivery attempt of the "200 OK" message succeeds after the UE 102 reconnects via the EPS 114, the delivery of the "200 OK" message may be delayed by at least a few seconds and thus delay overall setup of the call session. This can be frustrating for both the user of the originating UE 102A as well as the user of the terminating UE 102B who attempted to answer the call but has to wait for longer than expected for the call session to be fully set up.

Overall, race conditions between steps of the EPS fallback process shown in FIG. 2 and steps of the SIP messaging flow shown in FIG. 3 can negativity impact either or both of an originating UE 102A and a terminating UE 102B. For example, if both an originating UE 102A and a terminating UE 102B are initially connected to a 5GS 108, a 5GS 108 may prompt the originating UE 102A to do an EPS fallback after the originating UE 102A sends a SIP INVITE to the IMS 116. However, the same or a different 5GS 108 may also prompt the terminating UE 102B to also do an EPS fallback based on that SIP INVITE being delivered to the terminating UE 102B. Accordingly, one or both of the originating UE 102A and the terminating UE 102B can be instructed to perform EPS fallbacks and potentially prevent delivery of SIP messages via the original 5GS 108. In situations in which both an originating UE 102A and a terminating UE 102B are instructed to perform EPS fallbacks, the originating UE 102A and the terminating UE 102B may perform their respective EPS fallbacks at different times, such that a SIP message from one of the UEs 102 that has already finished its EPS fallback may nevertheless become undeliverable due to the other UE 102 doing its own separate EPS fallback.

Described below are systems and processes that can prevent a UE 102 from performing an EPS fallback until setup of a session with the IMS 116 has completed, or has reached a point in time at which SIP messages are less likely to be lost or be undeliverable due to the EPS fallback. In some examples, the 5G RAN 104 can determine that a UE 102 should perform an EPS fallback, but delay sending an instruction to the UE 102 to perform that EPS fallback until an EPS fallback trigger has been met, such as the expiration of a timer or a determination that the UE 102 and/or the IMS 116 are in a safe phase for EPS fallback procedures. In other examples, the 5G RAN 104 can send an instruction to a UE 102 to perform an EPS fallback procedure, but the UE 102 can delay performing the requested EPS fallback procedure until an EPS fallback trigger has been met, such as the UE 102 reaching a safe phase for EPS fallback procedures in a SIP signaling flow. Overall, the systems and processes described below can decrease the number of SIP messages that are lost or delayed due to EPS fallback procedures, thereby improving user experiences and improving call setup times.

Figure 4:
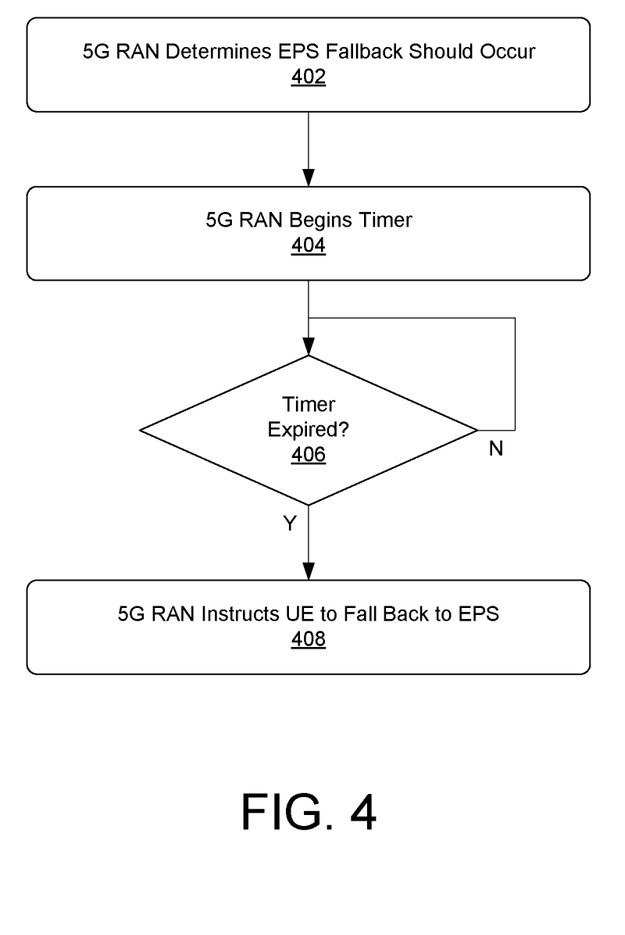
FIG. 4 depicts a flowchart of a first example process for delaying EPS fallback.

FIG. 4 depicts a flowchart of a first example process for delaying EPS fallback. In the example of FIG. 4, a UE 102 can be connected to the 5GS 108, and initiation of a call session through the IMS 116 can begin as described above with respect to block 202 of FIG. 2.

At block 402, the 5G RAN 104 can determine that an EPS fallback should occur. For example, a gNB of the 5G RAN 104 may be specifically configured to avoid handling transmission of data for voice calls, as described above with respect to block 206 of FIG. 2, or be configured to avoid handling data for video calls or other types of communication sessions. Accordingly, an indication that the UE 102 is making or receiving one of these types of calls or communications while connected to the 5G RAN 104 can prompt the 5G RAN 104 to determine that an EPS fallback should occur.

For example, a message from the 5G core network 106, such as the PDU session modification message requesting setup of a QoS flow for an IMS voice session described above with respect to block 204 of FIG. 2, can indicate to the 5G RAN 104 that the UE 102 is making or receiving a voice call and thus prompt the 5G RAN 104 to determine that an EPS fallback should occur when the 5G RAN 104 has been configured not to handle voice calls. In other examples, the 5G RAN 104 can determine that an EPS fallback should occur based on the 5G RAN 104 and/or 5G core network 106 being overloaded, the 5G RAN 104 and/or 5G core network 106 experiencing errors, and/or for any other reason.

At block 404, the 5G RAN 104 can begin running a timer set to a predetermined starting value. In some examples, the predetermined starting value can be between 200 milliseconds and one second. However, in other examples the predetermined starting value can be set to any higher or lower value.

In some examples, the predetermined starting value of the timer can be based on an average time that it takes to reach a certain point in the SIP messaging flow of FIG. 3, such as a period of time that would allow an originating UE 102A to, on average, receive an expected response message in the SIP messaging flow. For example, the predetermined starting value can be based on an average of measured round-trip times between an originating UE 102 sending a SIP INVITE message and receiving a "180 Ringing" and/or a "183 Session in Progress" message in response. In some examples, this predetermined starting value can be based on an average value for a UE 102 to reach an alerting phase 304 in the SIP messaging flow.

At block 406, the 5G RAN 104 can determine if the timer set during block 404 has expired. If the timer has not yet expired, the 5G RAN 104 can wait until the timer expires. Once 5G RAN 104 determines that the timer has expired at block 406, the 5G RAN 104 can consider an EPS fallback trigger to have been met and can move to block 408.

At block 408, the 5G RAN 104 can instruct the UE 102 to perform an EPS fallback. For example, the 5G RAN 104 can send a handover message or a release-and-redirect request to the UE 102 that instructs the UE 102 to connect to the LTE RAN 108 as part of the EPS fallback process. In some examples, the UE 102, the 5G RAN 104, and/or the LTE RAN 110 can send a message to the IMS 116 indicating that the IMS 116 should hold on to any in-transmit SIP messages until the EPS fallback process is complete. For example, the IMS 116 can expose an upper layer application programming interface (API) through which a network element can indicate that SIP messages should be held at the IMS 116, or that delivery of SIP messages can resume.

In some examples, while the 5G RAN 104 is waiting for the timer to expire, the 5G RAN 104 may perform other actions after it has determined that the EPS fallback should occur at block 402 but before the 5G RAN 104 instructs the UE 102 to perform the EPS fallback at block 408. For example, after determining that the EPS fallback should occur at block 402, the 5G RAN 104 may reject a PDU session modification message from the 5G core network 106, as described above with respect to block 208 of FIG. 2. As another example, while the timer is running the 5G RAN 104 may instruct the UE 102 to begin taking and/or reporting certain measurements in preparation for a later EPS fallback, such as signal strength measurement that can be used to help select an eNB for the UE 102. However, the 5G RAN 104 can wait until the timer has expired at block 406 to actually instruct the UE 102 to perform the EPS fallback at block 408.

Overall, by delaying an EPS fallback instruction from the 5G RAN 104 to the UE 102 until the timer has expired, the IMS 116 can be provided enough time to route SIP messages back and forth via the 5G RAN 104 to set up the call session, or at least reach a point in the call setup process where responsive SIP messages that the UE 102 is waiting for are less likely to become undeliverable due to the EPS fallback. Accordingly, setup of a communication session for a UE 102 with the IMS 116 via messages sent through the 5G RAN 104 can be allowed to continue during a timer period, before the eventual fallback to the LTE RAN 110 triggered by the 5G RAN 104 occurs.

Figure 5:
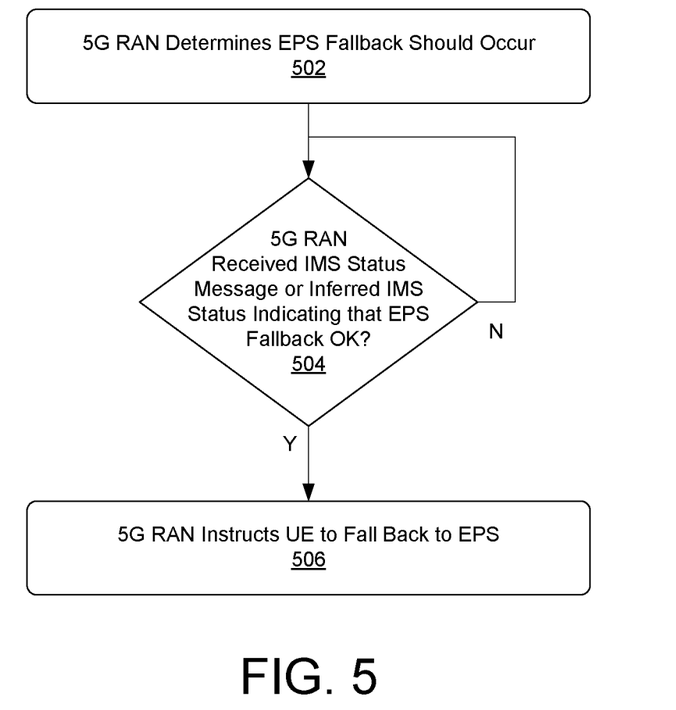
FIG. 5 depicts a flowchart of a second example process for delaying EPS fallback.

FIG. 5 depicts a flowchart of a second example process for delaying EPS fallback. In the example of FIG. 5, a UE 102 can be connected to the 5GS 108, and initiation of a voice call session through the IMS 116 can begin as described above with respect to block 202 of FIG. 2.

At block 502, the 5G RAN 104 can determine that an EPS fallback should occur. For example, a gNB of the 5G RAN 104 may be specifically configured to avoid handling transmission of data for voice calls, as described above with respect to block 206 of FIG. 2, or be configured to avoid handling data for video calls or other types of communication sessions. Accordingly, an indication that the UE 102 is making or receiving one of these types of calls or communications while connected to the 5G RAN 104 can prompt the 5G RAN 104 to determine that an EPS fallback should occur.

For example, a message from the 5G core network 106, such as the PDU session modification message requesting setup of a QoS flow for an IMS voice session described above with respect to block 204 of FIG. 2, can indicate to the 5G RAN 104 that the UE 102 is making or receiving a voice call and thus prompt the 5G RAN 104 to determine that an EPS fallback should occur when the 5G RAN 104 has been configured not to handle voice calls. In other examples, the 5G RAN 104 can determine that an EPS fallback should occur based on the 5G RAN 104 and/or 5G core network 106 being overloaded, the 5G RAN 104 and/or 5G core network 106 experiencing errors, and/or for any other reason.

At block 504, the 5G RAN 104 can determine if the 5G RAN 104 has received an IMS status message indicating that EPS fallback is OK at the current time. In some examples, an IMS status message can be sent to the 5G RAN 104 from a UE 102. For example, the IMS status message can be a Radio Resource Control (RRC) message sent from a UE 102 to a gNB of the 5G RAN 104. In other examples, an IMS status message can be sent to the 5G RAN 104 from the IMS 116. For example, the IMS status message can be an application layer message sent by an element of the IMS 116 to the 5G RAN 104, which can be accepted and/or read at the 5G RAN 104 based on an API provided by the 5G RAN 104. In some examples, the IMS status message can be an inter-layer communication sent from one layer of a protocol stack at a UE 102 or IMS 116 to another layer of the protocol stack at the 5G RAN 104.

In some examples, an IMS status message can be a message indicating that the UE 102 and accordingly the IMS 116, is in a pre-alerting phase 302, an alerting phase 304, an in-call phase 306, or any other phase with respect to a call session for the UE 102. The 5G RAN 104 can be configured to consider one or more of these phases as a safe phase during which an EPS fallback can occur, and/or be consider one or more of those phases as non-safe phases during which an EPS fallback should not occur.

For example, during a pre-alerting phase 302, an originating UE 102A may be waiting for one or more messages in response to an initial INVITE message, such as a responsive "100 Trying" message, "180 Ringing" message, or "183 Session in Progress" message, and an EPS fallback may interrupt delivery of one or more of those responsive messages and lead to an overall delay in setup of a call. Accordingly, the 5G RAN 104 can be configured to consider the pre-alerting phase 302 as a non-safe phase during which an EPS fallback should not occur.

However, 5G RAN 104 can be configured to consider an alerting phase 304, following receipt of a "180 Ringing" message and/or "183 Session in Progress" message at an originating UE 102, as a safe phase during which the 5G RAN 104 can instruct a UE 102 to perform an EPS fallback if needed. For example, during the alerting phase 304, the originating UE 102A may generally just be waiting for a "200 OK" message indicating that the terminating UE 102B has answered the call. In most situations, it may take a user of the terminating UE 102B a period of time to answer the call after it begins ringing. Accordingly, it can be considered safe to perform an EPS fallback during that period of time after the alerting phase 304 begins when a "200 OK" message is not likely to yet be in transit back to the originating UE 102A. A local ringback tone may continue to play for a user of the originating UE 102A during the alerting phase 304, even as an EPS fallback process occurs, such that the EPS fallback may not be noticeable by the user of the originating UE 102A. The EPS fallback may be able to finish during the alerting phase 304 before the IMS 116 tries to send a "200 OK" message from the terminating UE 102B back to the originating UE 102A.

In this example, an IMS status message sent to the 5G RAN 104 indicating that a UE 102 and/or the IMS 116 are in a pre-alerting phase 302 with respect to a call can be an indication that the UE 102 and/or the IMS 116 are in a non-safe phase during which an EPS fallback should not occur. However, an IMS status message sent to the 5G RAN 104 indicating that a UE 102 and/or the IMS 116 are in an alerting phase 304 with respect to the call can be an indication that the UE 102 and/or the IMS 116 are in a safe phase during which an EPS fallback can occur if needed.

In other examples, an IMS status message can be an indication that a particular message has been sent to, or received by, a UE 102 and/or that the UE 102 is not currently expecting a responsive message. For example, if an originating UE 102A has sent an INVITE message and the system is configured to ensure that the originating UE 102A receives a "183 Session in Progress" message with an SDP element that indicates which codecs the terminating UE 102B supports before an EPS fallback occurs, the originating UE 102A can send an IMS status messaging to the 5G RAN 104 indicating that an EPS fallback would be OK if needed after the originating UE 102A has received the "183 Session in Progress" message. In some examples, if a UE 102 is expecting a responsive message, the UE 102 can send an IMS status message to the 5G RAN 104 indicating that it is not OK to perform an EPS fallback at the current time, and then send another IMS status message to the 5G RAN 104 indicating that it is OK to perform an EPS fallback once the UE 102 has received the responsive message.

In yet other examples, the 5G RAN 104 can be configured to use other methods to determine an IMS status and to thereby determine if an EPS fallback is OK at the current time. For example, the 5G RAN 104 can perform a deep packet inspections or other processing of messages passing through the 5G RAN 104 to and from the UE 102 and the IMS 116, such that the 5G RAN 104 can determine if a message is an INVITE message, a "180 Ringing" message, a "183 Session in Progress" message, a "200 OK" message, or other any other type of message. The 5G RAN 104 may use such message analysis techniques to determine or infer an IMS status based on whether a UE 102 and IMS 116 are in a pre-alerting phase 302, alerting phase 304, in-call phase 306, or other phase with respect to a call, and thereby determine if an EPS fallback is allowable at the current time.

If the 5G RAN 104 determines at block 504 that EPS fallback is not OK at the current time, based on an IMS status message or an inferred IMS status, the 5G RAN 104 can wait until an IMS status message or inferred IMS status indicates that EPS fallback is OK at block 504. Once 5G RAN 104 determines that the IMS status indicates that EPS fallback is OK at the current time at block 504, the 5G RAN 104 can consider an EPS fallback trigger to have been met and can move to block 506.

At block 506, the 5G RAN 104 can instruct the UE 102 to perform an EPS fallback. For example, the 5G RAN 104 can send a handover message or a release-and-redirect request to the UE 102 that instructs the UE 102 to connect to the LTE RAN 108 as part of the EPS fallback process. In some examples, the UE 102, the 5G RAN 104, and/or the LTE RAN 110 can send a message to the IMS 116 indicating that the IMS 116 should hold on to any in-transmit SIP messages until the EPS fallback process is complete. For example, the IMS 116 can expose an upper layer API through which a network element can indicate that SIP messages should be held at the IMS 116, or that delivery of SIP messages can resume.

In some examples, while the 5G RAN 104 is waiting until an IMS status message or inferred IMS status indicates that EPS fallback is OK at block 504, the 5G RAN 104 may perform other actions after it has determined that the EPS fallback should occur but before the 5G RAN 104 instructs the UE 102 to perform the EPS fallback. For example, if the 5G RAN 104 determines that the EPS fallback should occur at block 502, but the 5G RAN 104 has not yet received an IMS status message indicating that the UE 102 and/or IMS 116 are in a safe phase to perform an EPS fallback, the 5G RAN 104 may still reject a PDU session modification message from the 5G core network 106, as described above with respect to block 208 of FIG. 2. As another example, while the 5G RAN 104 is waiting until an IMS status message or inferred IMS status indicates that EPS fallback is OK at block 504, the 5G RAN 104 may instruct the UE 102 to begin taking and/or reporting certain measurements in preparation for the EPS fallback, such as signal strength measurement that can be used to help select an eNB for the UE 102. Regardless, the 5G RAN 104 can wait until an IMS status message or inferred IMS status indicates that EPS fallback is OK at block 504 to actually instruct the UE 102 to perform the EPS fallback at block 506.

In some examples, the 5G RAN 104 may not need to wait to send an instruction to the UE 102 to perform an EPS fallback at block 506 after the 5G RAN 104 determines that the EPS fallback should occur at block 502. For example, if the 5G RAN 104 has already received an IMS status message or inferred an IMS status indicating that the UE 102 and/or IMS 116 are already in a safe phase for EPS fallback when the 5G RAN 104 determines that the EPS fallback should occur at block 502, the 5G RAN 104 can determine at block 504 that an IMS status message indicating that EPS fallback is OK at the current time has already been received, and thus proceed immediately to sending the EPS fallback instruction to the UE 102 at block 506.

Overall, by delaying an EPS fallback instruction from the 5G RAN 104 to the UE 102 in some cases until the 5G RAN 104 determines from an IMS status message or an inferred IMS status that the UE 102 and/or IMS 116 are in a safe phase for EPS fallback, the EPS fallback can occur during a point in time when the call session has been set up in the IMS 116 or at least has reached a point in the call setup process where responsive SIP messages that the UE 102 is waiting for are less likely to become undeliverable due to the EPS fallback. For example, the 5G RAN 104 may determine that an EPS fallback should occur while a UE 102 is in a pre-alerting phase 302, but hold off on sending an EPS fallback instruction to the UE 102 until the UE 102 sends an IMS status message to the 5G RAN 104 indicating that the UE 102 has reached the alerting phase 304 and/or has received a critical response message the UE 102 had been waiting for, such that it is now considered safe for the 5G RAN 104 to send the EPS fallback instruction to the UE 102.

Figure 6:
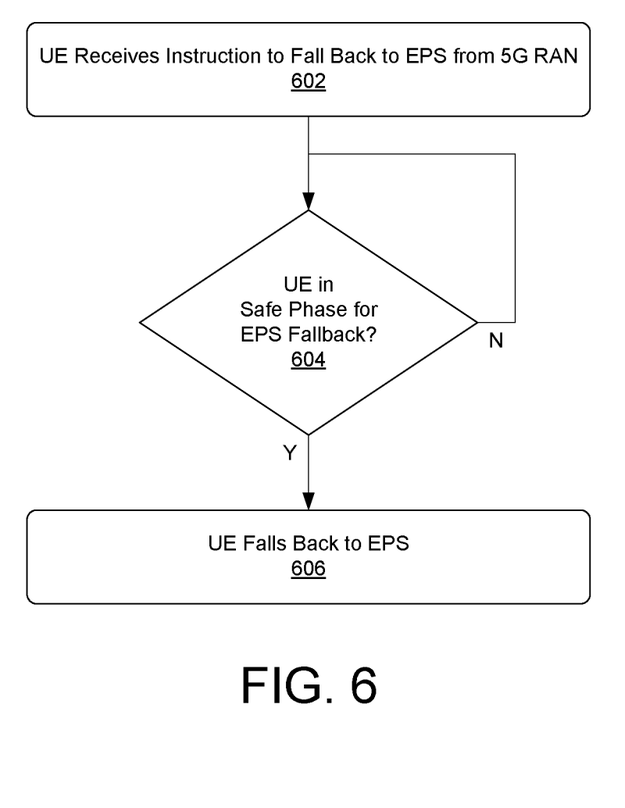
FIG. 6 depicts a flowchart of a third example process for delaying EPS fallback.

FIG. 6 depicts a flowchart of a third example process for delaying EPS fallback. In the example of FIG. 6, a UE 102 can be connected to the 5GS 108, and initiation of a voice call session through the IMS 116 can begin as described above with respect to block 202 of FIG. 2.

At block 602, the UE 102 can receive an instruction to perform an EPS fallback from the 5G RAN 104. For example, the UE 102 can receive a handover message or a release-and-redirect request from the 5G RAN 104 that instructs the UE 102 to connect to the LTE RAN 108 as part of the EPS fallback process.

At block 604, the UE 102 can determine if the UE 102 is currently in a safe phase for EPS fallback. For instance, in some examples, a pre-alerting phase 302 can be considered not safe for EPS fallback, while an alerting phase 304 can be considered safe for EPS fallback as described above. Accordingly, if the UE 102 is currently in the pre-alerting phase 302, the UE 102 can determine that it is not currently safe to perform the EPS fallback requested by the 5G RAN 104, and can wait until the call setup reaches the alerting phase 304 after the UE 102 receives a "180 Ringing" and/or "183 Session in Progress" message. At that point, the UE 102 can determine that the UE 102 has reached a safe phase to perform the EPS fallback requested by the 5G RAN 104.

In other examples, the determination as to whether the UE 102 is in a safe phase for EPS fallback can be based on whether the UE 102 has or has not received an expected response message in the call setup flow, and/or whether the UE 102 has received a particular critical message in the call setup flow. For example, if the UE 102 has sent a particular SIP message that it expects another UE 102 to respond to, the UE 102 can determine at block 604 that it is not safe to perform an EPS fallback until the UE 102 receives a response to that particular SIP message. In other examples, the UE 102 can be configured to consider itself in a non-safe phase for EPS fallback until the UE 102 receives a particular type of critical message, such as an "183 Session in Progress" message or a "200 OK" message that includes an SDP element identifying codecs supported by another UE 102 who will be a party to the call. Accordingly, upon receipt of a message with such an SDP element, the UE 102 can consider itself to have moved to a safe phase for EPS fallback.

Once the UE 102 determines at block 604 that the UE 102 is in a safe phase for EPS fallback, the UE 102 can consider an EPS fallback trigger to have been met and can move to block 606 and perform the requested EPS fallback. For example, as discussed above with respect to block 212 of FIG. 2, the EPS fallback can involve a Tracking Area Update (TAU) procedure, the UE 102 detaching from a gNB of the 5G RAN 104, the UE 102 attaching to an eNB of the LTE RAN 110 using a PDN connectivity request with, for example, a "handover" request type, and/or other operations. In some examples, the UE 102, the 5G RAN 104, and/or the LTE RAN 110 can send a message to the IMS 116 indicating that the IMS 116 should hold on to any in-transmit SIP messages until the EPS fallback process is complete. For example, the IMS 116 can expose an upper layer API through which a network element can indicate that SIP messages should be held at the IMS 116, or that delivery of SIP messages can resume.

In some examples, when the UE 102 receives an instruction from the 5G RAN 104 to perform an EPS fallback at block 602, if the UE 102 is not currently in a safe phase for EPS fallback, the UE 102 can wait at block 604 until it has reached a safe phase for EPS fallback, then move to block 606 to perform the EPS fallback. However, in other examples the UE 102 may already be in a safe phase for EPS fallback when the UE 102 receives an instruction from the 5G RAN 104 to perform an EPS fallback at block 602, and the UE 102 can accordingly proceed to directly perform the EPS fallback at block 606 without looping through block 604 more than once.

Overall, the process of FIG. 6 can allow the UE 102 to, if necessary, delay implementing an EPS fallback or following an EPS fallback instruction from a 5G RAN 104 until the UE 102 has reached a safe phase for the EPS fallback. This delay can allow a requested EPS fallback to occur during a point in time when a call session has been set up in the IMS 116 or at least has reached a point in the call setup process where responsive SIP messages that the UE 102 is waiting for are less likely to become undeliverable due to the EPS fallback.

Figure 7:
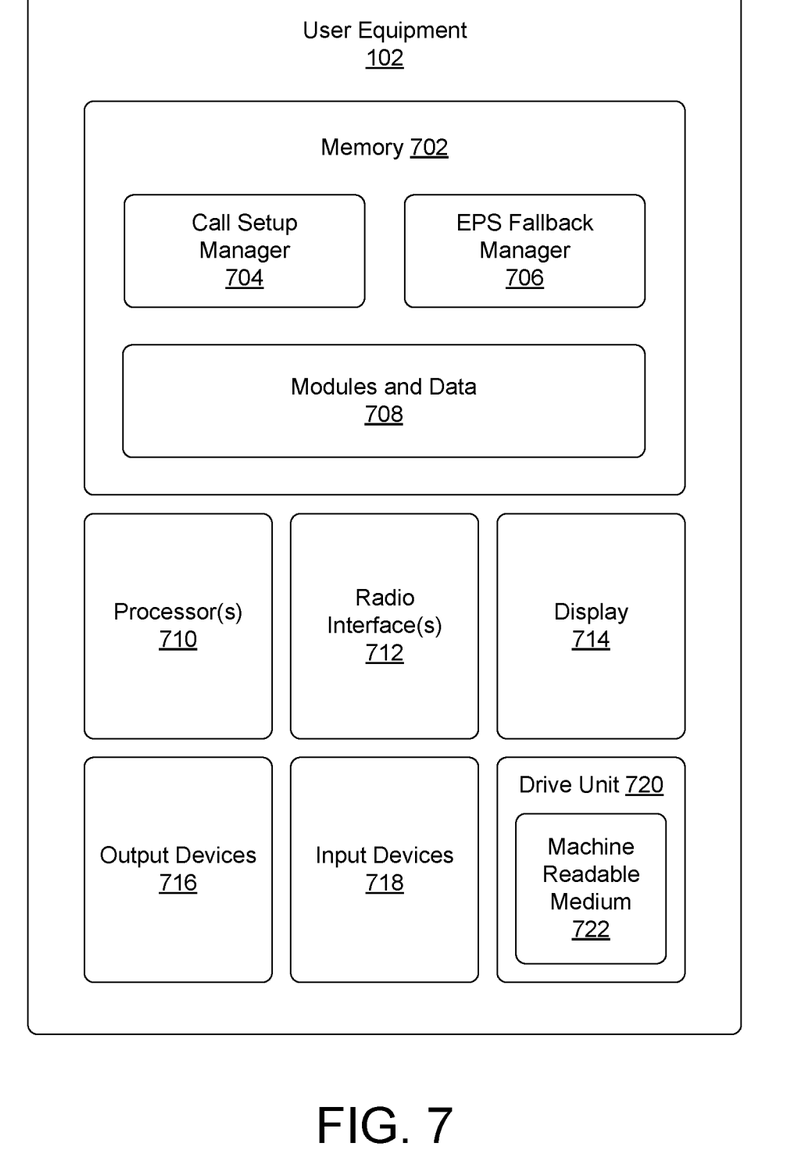
FIG. 7 depicts an example system architecture for a UE.

FIG. 7 depicts an example system architecture for a UE 102, in accordance with various examples. As shown, a UE 102 can have memory 702 storing a call setup manager 704, an EPS fallback manager 706, and other modules and data 708. A UE 102 can also have processor(s) 710, radio interfaces 712, a display 714, output devices 716, input devices 718, and/or a drive unit 720 including a machine readable medium 722.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 704 can send and/or receive SIP messages associated with setup and management of a call session via the IMS 116. The SIP messages can include any of the SIP messages shown in FIG. 3, and/or other SIP messages.

The EPS fallback manager 706 can determine, based on SIP messages sent and/or received via the call setup manager 704, whether the UE 102 is in a safe phase for EPS fallback. For example, the EPS fallback manager 706 can determine that the UE 102 is not in a safe phase for EPS fallback if the SIP messages sent or received for a call session so far indicate that the UE 102 is in a certain phase, such as a pre-alerting phase, that is considered not safe for EPS fallbacks, if the UE 102 has sent a particular SIP message but has not yet received a response to that particular SIP message, if or if a specific type of critical SIP message has not yet been received. In some example, the EPS fallback manager 706 can send an IMS status message to the 5G RAN 104 indicating that the UE 102 is or is not currently in a safe phase for EPS fallback, as discussed above with respect to FIG. 5. The EPS fallback manager 706 can also receive and/or implement instructions from the 5G RAN 104 to perform an EPS fallback. In some examples, the EPS fallback manager 706 can delay performance of an EPS fallback requested by the 5G RAN 104 until the EPS fallback manager 706 determines that the UE 102 has reached a safe phase for EPS fallback, as discussed above with respect to FIG. 6.

The other modules and data 708 can be utilized by the UE 102 to perform or enable performing any action taken by the UE 102. The modules and data 708 can include a UE platform, operating system, and applications, and data utilized by the platform, operating system, and applications.

In various examples, the processor(s) 710 can be a central processing unit (CPU), a graphics processing unit (GPU), or both CPU and GPU, or any other type of processing unit. Each of the one or more processor(s) 710 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 710 may also be responsible for executing all computer applications stored in the memory 702, which can be associated with common types of volatile (RAM) and/or nonvolatile (ROM) memory.

The radio interfaces 712 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 712 can be compatible with multiple radio access technologies, such as 5G radio access technologies and 4G/LTE radio access technologies. Accordingly, the radio interfaces 712 can allow the UE 102 to connect to the 5G RAN 104 and/or LTE RAN 110 described herein.

The display 714 can be a liquid crystal display or any other type of display commonly used in UEs 102. For example, display 714 may be a touch-sensitive display screen, and can then also act as an input device or keypad, such as for providing a soft-key keyboard, navigation buttons, or any other type of input. The output devices 716 can include any sort of output devices known in the art, such as a display 714, speakers, a vibrating mechanism, and/or a tactile feedback mechanism. Output devices 716 can also include ports for one or more peripheral devices, such as headphones, peripheral speakers, and/or a peripheral display. The input devices 718 can include any sort of input devices known in the art. For example, input devices 718 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 722 can store one or more sets of instructions, such as software or firmware, that embodies any one or more of the methodologies or functions described herein. The instructions can also reside, completely or at least partially, within the memory 702, processor(s) 710, and/or radio interface(s) 712 during execution thereof by the UE 102. The memory 702 and the processor(s) 710 also can constitute machine readable media 722.

Figure 8:
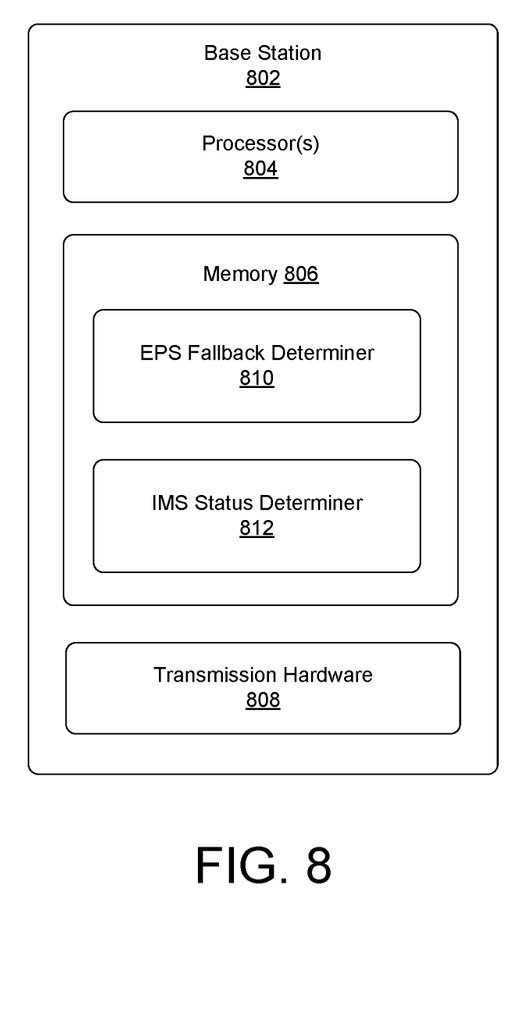
FIG. 8 depicts an example system architecture for a base station.

FIG. 8 depicts an example system architecture for a base station 802, in accordance with various examples. In some examples, the base station 802 can be a gNB or other element of the 5G RAN 104. As shown, the base station 802 can include processor(s) 804, memory 806, and transmission hardware 808. The memory 806 can store computer-readable instructions and/or other data associated with an EPS fallback determiner 810, an IMS status determiner 812, and/or operations of the base station 802.

In various examples, the processor(s) 804 can be a central processing unit (CPU), a graphics processing unit (GPU), both CPU and GPU, or any other type of processing unit. Each of the one or more processor(s) 804 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 804 may also be responsible for executing all computer applications stored in the memory 806, which can be associated with common types of volatile (RAM) and/or nonvolatile (ROM) memory.

In various examples, memory 806 can include system memory, which may be volatile (such as RAM), non-volatile (such as ROM, flash memory, etc.) or some combination of the two. The memory 806 can also include additional data storage devices (removable and/or non-removable) such as, for example, magnetic disks, optical disks, or tape. Memory 806 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 802. Any such non-transitory computer-readable media may be part of the base station 802.

The transmission hardware 808 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102 and a 5G core network 106, and transmit data over such connections. For example, the transmission hardware 808 can establish a connection with a UE 102 over an air interface, and a connection with the 5G core network 106. The transmission hardware 808 can also support transmissions using one or more radio access technologies, such as 5G New Radio, as discussed above.

The EPS fallback determiner 810 can determine that a UE 102 should fall back from engaging in a communication session via the 5G RAN 104 and/or 5G core network 106 of the 5GS 108 to instead engage in the communication session via the LTE RAN 110 and/or LTE core network 112 of the EPS 114. In some examples, the EPS fallback determiner 810 can be configured by an operator of the 5G RAN 104 or other entity to avoid handling the transport of traffic for certain types of communication sessions. For example, the base station 802 can be configured to avoid handling voice calls and/or video calls, such that the EPS fallback determiner 810 determine that a UE 102 should fall back to an EPS 114 to conduct voice calls or video calls. In other examples, the EPS fallback determiner 810 may determine that a UE 102 should fall back from the 5GS 108 to the EPS 114 for any other reason, for example if the 5GS 108 is overloaded or is experiencing errors.

The EPS fallback determiner 810 can also send instructions to a UE 102 to request that the UE 102 perform an EPS fallback, such as by sending a release-and-redirect message or handover request to the UE. However, as described herein, in some examples the EPS fallback determiner 810 can delay sending such EPS fallback instructions to an UE 102 based on a timer, until an IMS status indicates that the UE 102 and/or the IMS 116 is in a safe phase for EPS fallback with respect to a call, and/or for any other reason.

The IMS status determiner 812 can determine whether a UE 102 and/or the IMS 116 is in a safe phase for EPS fallback. In some examples, the IMS status determiner 812 can receive IMS status messages from a UE 102 and/or the IMS 116 that indicate whether the UE 102 and/or the IMS 116 are, or are not, in a safe phase for EPS fallback, as described above. In some examples, the IMS status determiner 812 can expose an API that allows the IMS status determiner 812 to receive such IMS status messages from UEs 102 and/or the IMS 116. In some examples, such IMS status messages can indicate a phase that a UE 102 and/or IMS 116 are currently in, such as a pre-alerting phase 302, an alerting phase 304, an in-call phase 306, and/or other phases, and the IMS status determiner 812 can determine if the indicated phase is or is not a safe phase for EPS fallback procedures. In other examples, IMS status messages can indicate when a UE 102 and/or IMS 116 has sent or received particular messages, such that the UE 102 is not currently expecting a particular response message, thereby indicating that the current time is a safe phase to perform EPS fallback procedures.

In other examples, the IMS status determiner 812 can perform deep packet inspections or other analysis operations on data passing through the base station 802 between a UE 102 and the IMS 116, for example to determine types of SIP messages being exchanged during a call setup process from which the IMS status determiner 812 can infer a current IMS status. The inferred IMS status can, for example, indicate that a history of exchanged SIP messages indicates that a UE 102 is currently in an alerting phase 304, which may be considered a safe phase for EPS fallback.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
    determining, by a base station of a fifth generation (5G) radio access network (RAN), that a user equipment (UE) should fall back to an Evolved Packet System (EPS) to engage in a communication session that is being set up for the UE through an Internet Protocol Multimedia Subsystem (IMS);
    running, by the base station, a timer initialized to a predetermined starting value upon determining that the UE should fall back to the EPS, the predetermined starting value of the timer being at least an average period of time for the UE to reach an alerting phase during set of the communication session through the IMS;
    delaying, by the base station, sending an instruction to the UE to perform the fall back to the EPS based on a determination that an EPS fallback trigger has not yet been met while the timer is running;
    receiving, by the base station, an IMS status message from the UE indicating that the UE is not currently expecting a response message for setup of the communication session from the IMS;
    determining, by the base station, that the EPS fallback trigger has been met when the timer expires; and
    sending, by the base station, the instruction to the UE to perform the fall back to the EPS following the determination that the EPS fallback trigger has been met.

2. The method of claim 1, further comprising:
    receiving, by the base station, an IMS status message that indicates whether the communication session is in a pre-alerting phase, an alerting phase, or an in-call phase, and
    wherein at least one of the pre-alerting phase, the alerting phase, and the in-call phase is designated as a safe phase for an EPS fallback.

3. The method of claim 2, wherein the base station determines that the EPS fallback trigger has been met when the IMS status message indicates that the communication session is in the safe phase for the EPS fallback.

4. The method of claim 2, wherein the IMS status message is received from the UE.

5. The method of claim 2, wherein the IMS status message is received from the IMS.

6. The method of claim 1, wherein the base station determines that the EPS fallback trigger has been met based on the IMS status message indicating that the UE is not currently expecting the response message.

7. The method of claim 1, wherein the base station determines that the UE should fall back to the EPS to engage in the communication session based on a message received from a 5G core network requesting that the base station set up a Quality of Service flow for an IMS voice session for the communication session.

8. The method of claim 1, wherein the instruction to the UE to perform the fall back to the EPS is a handover message or a release-and-redirect request.

9. The method of claim 1, further comprising sending a "180 Ringing" or "183 Session in Progress" message to the UE.

10. A base station of a fifth generation (5G) radio access network (RAN), comprising:
one or more processors; and
memory storing computer-executable instructions that, when executed by the one or more processors, cause the base station to perform operations comprising:
determining that a user equipment (UE) should fall back to an Evolved Packet System (EPS) to engage in a communication session that is being set up for the UE through an Internet Protocol Multimedia Subsystem (IMS);
running, by the base station, a timer initialized to a predetermined starting value upon determining that the UE should fall back to the EPS, the predetermined starting value of the timer being at least an average period of time for the UE to reach an alerting phase during set of the communication session through the IMS;
delaying sending an instruction to the UE to perform the fall back to the EPS based on a determination that an EPS fallback trigger has not yet been met while the timer is running;
receiving an IMS status message from the UE indicating that the UE is not currently expecting a response message for setup of the communication session from the IMS;
determining that the EPS fallback trigger has been met when the timer expires; and
sending the instruction to the UE to perform the fall back to the EPS following the determination that the EPS fallback trigger has been met.

11. The base station of claim 10, wherein the operations further comprise:
running a timer initialized to a predetermined starting value upon determining that the UE should fall back to the EPS,
wherein the base station determines that the EPS fallback trigger has not yet been met while the timer is running, and determines that the EPS fallback trigger has been met when the timer expires.

12. The base station of claim 10, wherein the operations further comprise:
receiving an IMS status message, from at least one of the UE and the IMS, that indicates whether the communication session is in a pre-alerting phase, an alerting phase, or an in-call phase,
wherein at least one of the pre-alerting phase, the alerting phase, and the in-call phase is designated as a safe phase for an EPS fallback, and
wherein the base station determines that the EPS fallback trigger has been met when the IMS status message indicates that the communication session is in the safe phase for the EPS fallback.

13. The base station of claim 10, wherein the base station determines that the EPS fallback trigger has been met based on the IMS status message indicating that the UE is not currently expecting the response message.

14. The base station of claim 10, wherein the IMS status message is received from the UE.

15. The base station of claim 10, wherein the IMS status message is received from the IMS.

16. The base station of claim 10, further comprising sending a "180 Ringing" or "183 Session in Progress" message to the UE.

17. A method comprising:
receiving, by a user equipment (UE), an instruction from a fifth generation (5G) radio access network (RAN) to fall back to an Evolved Packet System (EPS) to engage in a communication session that is being set up for the UE through an Internet Protocol Multimedia Subsystem (IMS);
delaying, by the UE, following the instruction to fall back to the EPS based on a determination that an EPS fallback trigger has not yet been met;
determining, by the UE, that the EPS fallback trigger has been met, wherein the UE determines that the EPS fallback trigger has been met upon the UE reaching an alerting phase indicating that a terminal UE is ringing, wherein the alerting phase is reached when the UE receives a "180 Ringing" message from the IMS following the UE sending a call invite message; and
attaching, by the UE, to the EPS following the determination that the EPS fallback trigger has been met.

18. The method of claim 17, wherein the UE determines that the EPS fallback trigger has not yet been met based on the UE having sent a first SIP message via the IMS and having not yet received a second SIP message in response to the first SIP message, and the UE determines that the EPS fallback trigger has been met upon the UE receiving the second SIP message.

19. The method of claim 17, wherein the UE determines that the EPS fallback trigger has not yet been met based on the UE having not yet received an expected critical SIP message from the IMS during set up of the communication session, and the UE determines that the EPS fallback trigger has been met upon the UE receiving the expected critical SIP message.

20. The method of claim 19, wherein the expected critical SIP message is a message that includes a Session Description Protocol (SDP) element from a second UE.

* * * * *